Figure 1:
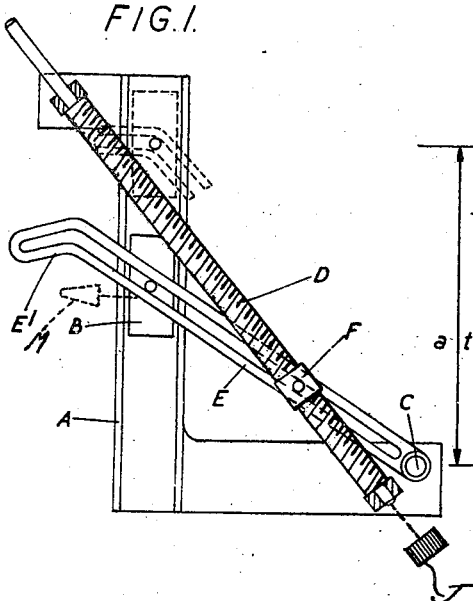

April 9, 1946.   J. M. STRANG ET AL   2,398,198
MECHANISM FOR THE CONVERSION OF MOTION ACCORDING TO
ONE LAW INTO MOTION ACCORDING TO ANOTHER LAW
Filed May 25, 1943

John Martin Strang
Jan Charles McLean Bell,
Inventors
Hewitt Griggs Robertson
By
Attorney Patented Apr. 9, 1946

2,398,198

UNITED STATES PATENT OFFICE 2,398,198

MECHANISM FOR THE CONVERSION OF MOTION ACCORDING TO ONE LAW INTO MOTION ACCORDING TO ANOTHER LAW

John Martin Strang and Ian Charles McLean Bell, Glasgow, Scotland, assignors to Barr & Stroud, Limited, Glasgow, Scotland Application May 25, 1943, Serial No. 488,450
In Great Britain August 24, 1940

7 Claims. (Cl. 74—59)

This invention refers to mechanism for the conversion of motion according to one law into motion according to another law, particularly, but not exclusively, in connection with rangefinders, heightfinders, and like optical measuring instruments, hereinafter for convenience referred to generally as rangefinders. Rangefinders of the translating prism type, i. e. of the type in which measurement is effected by translation movement of a light deviating prism (or prisms) operate by measuring parallax angle and the movement of the prism or prisms is not proportional to range but to reciprocal of range. Thus, ordinarily the scale of the instrument is a reciprocal scale, with the graduations becoming increasingly crowded together for higher ranges. This crowding together of the graduations at high range makes reading of the scale more difficult than at low ranges. The specification of Patent British No. 133,974, granted to Barr & Stroud, Limited, and others, and of British Patent No. 499,053, granted to Barr & Stroud, Limited, show mechanism for converting motion according to the reciprocal law into motion according to a uniform scale. Specification of British Patent No. 324,518, granted to Barr & Stroud, Limited, and others, shows how such conversion can be effected optically. It is with conversion apparatus for the conversion of motion according to the reciprocal law into motion according to a uniform scale that the present invention is concerned, particularly as applied to instruments of rangefinder type in which it may serve to give readings on a uniform scale of range, on a uniform scale of height, or on a uniform scale of other function of range or parallax.

According to the present invention, conversion apparatus of the kind referred to comprises a first element which is arranged to move in a rectilinear path between lower and upper limits, a lever slidably and pivotally engaged with the first element and movable about a pivot which is fixed in position relative to said path and located to one side thereof on a line perpendicular to that path at the lower limit position, and a second element slidably and pivotally engaged with the lever and arranged to move in a rectilinear guide the line of which intersects the aforesaid path above the lower limit position and intersects the perpendicular from the lever pivot to the path at an intermediate point, the arrangement being such that movement of the second element along its path causes angular movement of the lever and the angular movement of the lever causes movement of the first movable element, the second movable element moving according to a uniform scale and the first movable element being moved according to a reciprocal scale.

In applying conversion apparatus in accordance with the present invention to an instrument of rangefinder type the measuring prism is caused to move with the first movable element of the apparatus and the second movable element is operated from the working head of the instrument.

For direct conversion, such as conversion to a uniform scale of range, the apparatus comprises two guides constituting paths for movement of the two movable elements, the guides being relatively fixed in position with the line of the second path intersecting the line of the first path at the upper limit position.

For other conversions, such as conversion to a uniform scale of heights, modification by a factor which can be varied at will may be necessary, for which purpose provision is made for varying the relative positions of the two guides in accordance with the factor in question. Thus, the apparatus may be such that the second guide can be displaced relative to the first guide so as to occupy various positions, all parallel with one another. In what may be termed the basic position, the two relatively movable guides occupy relative positions as for the direct conversion referred to in the preceding paragraph. When displaced from the basic position, modification by the factor in question is effected, the magnitude of the factor applied varying with the amount of the displacement.

For a uniform scale of heights the factor is $\sin \alpha$, where $\alpha$ is the angle of elevation of the line of sight to the object under observation.

It is usual in instruments of the rangefinder type to provide for the travel of the measuring prism from a position corresponding with the lowest range to be measured to a position corresponding with the highest range to be measured and beyond the latter position to an infinity position, for testing and adjusting purposes. In the application of the present invention to an instrument which provides for infinity setting of the measuring prism, the line of the path of the second movable element is parallel with the line joining the infinity position to the lever pivot and the lever has an extension to enable it to carry the first movable element past the highest range position to the infinity position.

Generally the second movable element of conversion apparatus in accordance with the invention is screw operated, a screw threaded member constituting the second guide.

With an extension of the lever for effecting infinity setting, as above described, the screw is a constant pitch screw. Another method of obtaining infinity adjustment is to arrange that the path of the second movable element diverges somewhat from true parallelism with the line joining the infinity position to the lever pivot, the lead of the screw for moving the second movable element being modified from uniform pitch to give movement in accordance with uniform scale.

Two examples of conversion apparatus according to the invention for an instrument of rangefinder type are shown in the accompanying drawing, in which—

Figure 2:
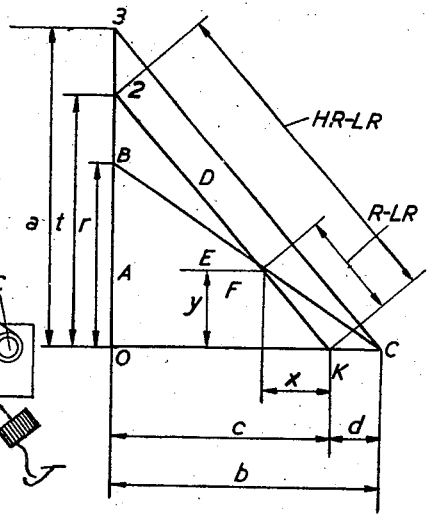
Figure 4:
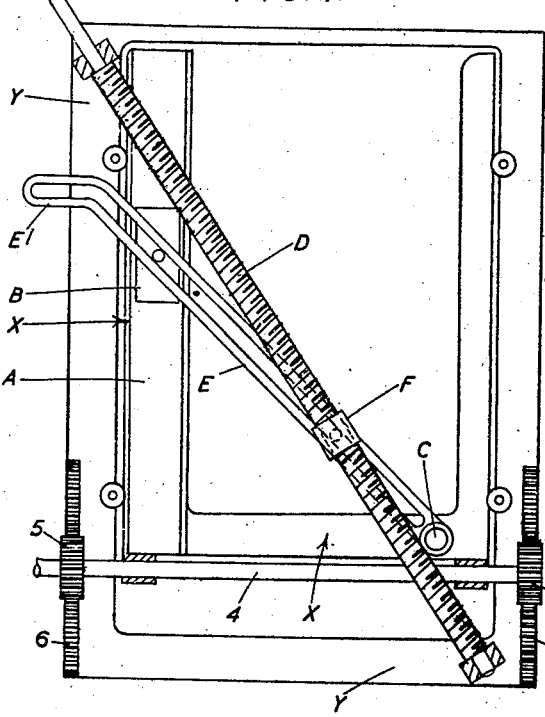
Figure 3:
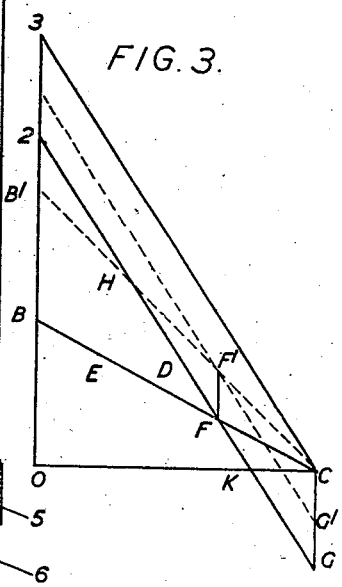

Figure 1 shows a first example,
Figure 2 is an explanatory diagram for Figure 1, and
Figures 3 and 4 show a second example.

The apparatus shown in Figure 1 comprises a rectilinear guide A, a slide B movable in the guide A and with which the measuring prism of the instrument is movable, a fixed pivot C, a constant pitch screw D carried at each end in stationary bearings on the supporting frame, a slotted lever E pivoted at C, with the slot in which a pin on the slide B engages, and a nut F on the screw D having a pin engaging with the slot of the lever E. The pivot C is on a line at right angles to the guide A and intersecting the guide at the position 0 of the slide B corresponding with the lowest range which the instrument is to measure. The guide A extends from the lowest range position through a position 2 corresponding with the highest range which the instrument is to measure, and beyond that to an infinity position 3. At the end away from the pivot C, an extension $E^1$ of the lever is cranked relative to the rest of its length. The axis of the screw D is parallel with the line joining the infinity position to the pivot C and intersects the guide A at the highest range position thereon.

The operating head J by means of which the operator sets the instrument to give range readings (by bringing two partial images into coincidence in the case of a coincidence rangefinder), causes rotation of the screw D, which causes the lever E to swing about the pivot C. Swinging of the lever E in turn causes longitudinal movement of the slide B in the guide A, the slide carrying the measuring prism M with it. While the rotational movement of the operating head is in accordance with a uniform scale, the motion of the slide B is in accordance with the reciprocal law.

The cranking $E^1$ of the lever E is to enable the lever to bring the slide B to the infinity position. It will be understood that the slot in the lever E is deep enough to allow the pin on nut F and the pin on the slide B to pass one another, the two pins projecting into the slot from opposite sides.

Another method of providing for bringing the slide B to the infinity position is for the screw D to diverge from parallelism with the line 3—C, the line of the axis of the screw then being 3—K. In this case, to give a uniform scale for uniform revolution of the screw, a slight modification of the lead of the screw from uniform pitch is required.

Figure 2 illustrates diagrammatically rangefinder conversion apparatus according to the invention for purposes of explanation, the same reference letters being used to denote the elements of the apparatus as in Figure 1.

Let:
$a$ = travel of prism from lowest range to be measured to infinity.
$b$ = distance of lever pivot C from guide A.
$t$ = travel of prism from lowest range to be measured to highest range to be measured.
$r$ = travel of slide B for any range from lowest range position.
$d$ = distance between the pivot C and the intersection of the axis of the screw D with the perpendicular from C to the guide A.
$HR$ = highest range to be measured.
$LR$ = lowest range to be measured.
$R$ = any given range between HR and LR.
Length of screw D represents value $HR-LR$.
Distance of nut F from LR position K of screw corresponding with R represents value $R-LR$.

Then:

$$c = \text{distance to start of screw} = b \times \frac{HR-LR}{HR}$$

$$d = b - b \times \frac{HR-LR}{HR} = b \times \frac{LR}{HR}$$

Since $$\frac{t}{a} = \frac{c}{b}$$

$$t = a \times \frac{HR-LR}{HR}$$

Since $$\frac{y}{t} = \frac{R-LR}{HR-LR}$$

$$y = a \times \frac{HR-LR}{HR} \times \frac{R-LR}{HR-LR} = a \times \frac{R-LR}{HR}$$

Since $$\frac{x}{c} = \frac{R-LR}{HR-LR}$$

$$x = b \times \frac{HR-LR}{HR} \times \frac{R-LR}{HR-LR} = b \times \frac{R-LR}{HR}$$

$$x + d = b \times \frac{R-LR}{HR} + b \times \frac{LR}{HR} = b \times \frac{R}{HR}$$

Since $$\frac{x+d}{y} = \frac{b}{r}$$

$$r = b \times \frac{y}{x+d}$$

$$= \left( b \times a \times \frac{R-LR}{HR} \right) \div b \times \frac{R}{HR}$$

$$= a \times \frac{R-LR}{R} \text{ for any range}$$

Referring now to Figures 3 and 4, these show how conversion apparatus according to the present invention may be applied to a heightfinder, say of the coincidence type, to give readings of height of object on a uniform scale, $\alpha$ being the angle of elevation of the line of sight.

The appartus comprises a frame X of which the guide A forms a part and on which the lever E is pivoted at C. The screw D is journalled in bearings on a carriage Y movable relative to the frame X in a direction parallel with the guide A. The frame X carries a transverse spindle 4 with pinion wheels 5 engaging with racks 6 on the carriage Y. Rotation of the spindle 4 thus causes displacement of the carriage Y relative to the frame X. The carriage and screw are displaced in accordance with the magnitude of the angle of sight α.

Figure 3 illustrates the operation of the apparatus, the part of the figure drawn in full lines being the same as Figure 2.

The position of the screw to indicate uniform scale of range is shown by line G2, this being the basic position previously referred to.

For change in α from 90 degrees, the movement is along line GC, and the movement is in accordance with sin α. With the screw moved to the position F¹G¹, the lever controlling the measuring prism would be in the position CB¹, B¹ being the position of the measuring prism for range GH.

F¹G¹ is parallel to HG.

∴ Triangles HGC and F¹G¹C are similar.

$$\therefore \frac{F^1G^1}{HG} = \frac{CG^1}{CG}$$

but CG equals movement from 0° α to 90° α.

$$\therefore CG = 1, \text{ and } CG^1 = \sin \alpha$$

$$\therefore \frac{F^1G^1}{HG} = \sin \alpha$$

But HG=range, and HR sin α=height.

∴ F¹G¹=height corresponding to range HG and angle of sight α.

We claim:

1. Apparatus for the conversion of motion according to the reciprocal law to motion according to a uniform scale comprising a rectilinear guide, a first element movable along the said guide between lower and upper limits, a pivot fixed in position relative to said guide and to one side of it, a lever movable about said pivot and extending obliquely relative to said guide, means by which the first element slidably and pivotally engages with said lever, and a second element movable along a rectilinear path extending obliquely to and intersection the line of the said guide above the lower limit position and intersecting the perpendicular from the lever pivot to the said guide at an intermediate point, said second element being slidably and pivotally engaged with the lever, movement imparted to one of the two elements being converted reciprocally in its transmission to the other of the two elements.

2. Apparatus for the conversion of motion according to the recpiroical law to motion according to a uniform scale comprising a rectilinear guide, a first element movable along said guide between lower and upper limits, a pivot fixed in position relative to said guide and to one side of it, a lever movable about said pivot and extending obliquely relative to said guide, means by which the first element slidably and pivotally engages with said lever, a screw-threaded rod extending obliquely to and intersecting the line of the first guide above the lower limit position and intersecting the perpendicular from the lever pivot to the first guide at an intermediate point, and a second element, in the form of a nut, movable along said screw-threaded rod and slidably and pivotally engaged with the lever, movement along its guide imparted to the second element being converted reciprocally in its transmission to the first element.

3. Apparatus for the conversion of motion according to the reciprocal law to motion according to uniform scale comprising a rectilinear guide, a first element movable along said guide between lower and upper limits, a pivot fixed in position relative to said guide and to one side of it, a lever movable about said pivot and extending obliquely relative to said guide, said lever being slotted along its length, a pin projecting from the first element and slidably and pivotally engaging with said slot, a screw-threaded rod extending obliquely to and intersecting the line of the first guide above the lower limit position and intersecting the perpendicular from the lever pivot to the first guide at an intermediate point, and a second element, in the form of a nut, movable along the said screw-threaded rod and slidably and pivotally engaged with the slot of the lever, movement along its guide imparted to the second element being converted reciprocally in its transmission to the first element.

4. Apparatus for the conversion of motion according to the reciprocal law to motion according to a uniform scale comprising a rectilinear guide, a first element movable along said guide between lower and upper limits, a pivot fixed in position relative to said guide and to one side of it, a lever movable about said pivot and extending obliquely relative to said guide, means by which the first element slidably and pivotally engages with said lever, and a second element movable along a rectilinear path extending obliquely to and intersecting the line of the said guide above the lower limit position and intersecting the perpendicular from the lever pivot to the said guide at an intermediate point, said guide and said path being relatively fixed in position, said second element being slidably and pivotally engaged with the lever, movement imparted to one of the two elements being converted reciprocally in its transmission to the other of the two elements.

5. Apparatus for the conversion of motion according to the reciprocal law to motion according to a uniform scale comprising a rectilinear guide, a first element movable along said guide between lower and upper limits, a pivot fixed in position relative to said guide and to one side of it, a lever movable about said pivot and extending obliquely relative to said guide, means by which the first element slidably and pivotally engages with said lever, a second element movable along a rectilinear path extending obliquely to and intersecting the line of the said guide above the lower limit position and intersecting the perpendicular from the lever pivot to the said guide at an intermediate point, said second element being slidably and pivotally engaged with the lever, and means for varying the relative positions of said guide and said path in a predetermined manner, movement imparted to one of the two elements being converted reciprocally in its transmission to the other of the two elements and relative displacement of the guide and path from a basic position effecting modification of the conversion by a factor the magnitude of which varies with the amount of displacement.

6. Apparatus for the conversion of motion according to the reciprocal law to motion according to a uniform scale comprising a rectilinear guide, a first element movable along said guide between lower and upper limits, a pivot fixed in position relative to said guide and to one side of it, a lever movable about said pivot and extending obliquely relative to said guide, means by which the first element slidably and pivotally engages with said lever, a carriage movable relative to said guide in directions parallel with that guide, a second element movable along a rectilinear path on said carriage and extending obliquely to and intersecting the line of the said guide above the lower limit position and intersecting the perpenan intermediate point, said second element being slidably and pivotally engaged with the lever, and mechanism for moving said carriage relative to the said guide, movement along its path imparted to the second element being converted reciprocally in its transmission to the first element and displacement of the carriage from a basic position effecting modification of the conversion by a factor the magnitude of which varies with the amount of the displacement.

7. Apparatus for the conversion of motion according to the reciprocal law to motion according to a uniform scale comprising a rectilinear guide, a first element movable along said guide between lower and upper limits, a pivot fixed in position relative to said guide and to one side of it, a lever movable about said pivot and extending obliquely relative to said guide, means by which the first element slidably and pivotally engages with said lever, a carriage movable relative to the first guide in directions parallel with the length of said guide, a screw-threaded rod rotatably mounted on said carriage and extending obliquely to and intersecting the line of the first guide above the lower limit position and intersecting the perpendicular from the lever pivot to the first guide at an intermediate point, a second element, in the form of a nut, movable along said screw-threaded rod and slidably and pivotally engaged with the lever, and mechanism for moving said carriage relative to the first guide, movement of the nut along the screw-threaded rod being converted reciprocally in its transmission to the first element and displacement of the carriage from a basic position effecting modification of the conversion by a factor the magnitude of which varies with the amount of the displacement.

J. MARTIN STRANG.
IAN C. BELL.